United States Patent [19]

Meenan

[11] 3,794,459
[45] Feb. 26, 1974

[54] FURNACE EXHAUST TREATMENT SYSTEM

[75] Inventor: Cyril F. Meenan, Lincolnwood, Ill.

[73] Assignee: Meenan Corporation, Skokie, Ill.

[22] Filed: Nov. 29, 1972

[21] Appl. No.: 310,651

[52] U.S. Cl............................ 431/5, 432/72, 60/303, 23/277 C
[51] Int. Cl..................... F23d 13/20, F23j 15/00
[58] Field of Search ....... 23/277 C; 110/8 A; 34/72; 431/5, 115; 60/298, 303; 432/72, 222

[56] References Cited
UNITED STATES PATENTS

| | | | |
|---|---|---|---|
| 2,906,368 | 9/1959 | Nelson | 23/277 C |
| 3,627,290 | 12/1971 | Grieve | 432/72 |
| 3,073,684 | 1/1963 | Williams, Sr. | 431/5 X |
| 3,603,080 | 9/1971 | McCrocklin | 23/277 C X |
| 3,484,189 | 12/1969 | Hardison et al. | 23/277 C X |
| 2,880,079 | 3/1959 | Cornelius | 60/303 X |
| 3,404,965 | 10/1968 | Shiller | 23/277 C X |

Primary Examiner—William F. O'Dea
Assistant Examiner—William C. Anderson

[57] ABSTRACT

An exhaust treatment process and apparatus for eliminating contaminated air by-products emitted by a hot air furnace or the like. The process includes transporting the contaminated air to a second furnace, providing in addition to said contaminated air, primary and secondary air to said second furnace, burning the contaminated air for a sufficient period of time to produce substantially contaminant free air, mixing the contaminant free air with outside air and transporting the mixed contaminant free air back to the first furnace and to the atmosphere.

The apparatus employed to effect the above process includes a second furnace for burning the contaminated air having a combustion chamber with a burner having a fuel discharge nozzle disposed at one end of the chamber which is adapted to produce a flame by igniting a fluid fuel discharged under pressure through the nozzle. A conduit disposed in the chamber at positions along the length thereof carries the contaminated air in the chamber. The burner is supplied with fluid fuel and two sources of air to support combustion. The contaminated air is burned in the chamber which results in substantially contaminant free air. The contaminant free air is then put through a mixer and is recycled to the first furnace and vented to the atmosphere.

14 Claims, 5 Drawing Figures

PATENTED FEB 26 1974 3,794,459

PATENTED FEB 26 1974
3,794,459
SHEET 2 OF 2
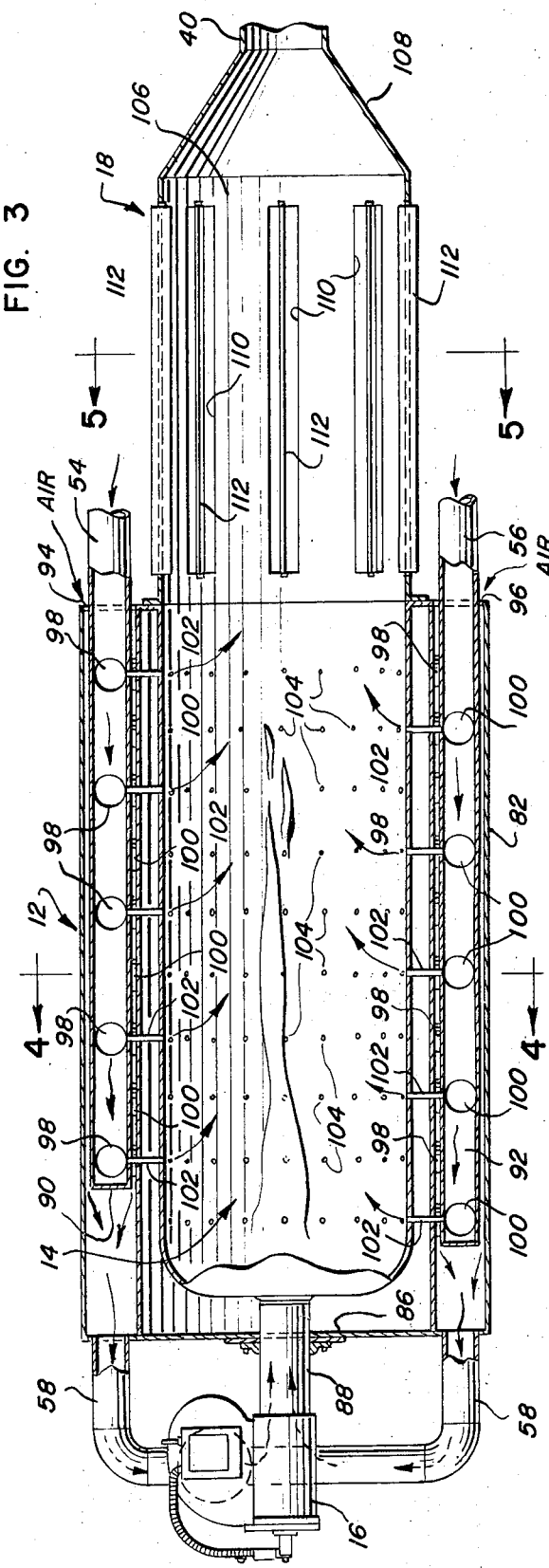
FIG. 3
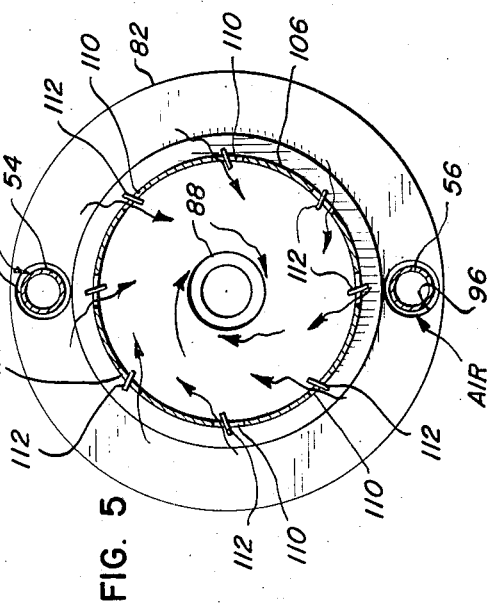
FIG. 5
FIG. 4

3,794,459

FURNACE EXHAUST TREATMENT SYSTEM

BACKGROUND OF THE INVENTION

1. Field of the Invention

The present invention relates generally to furnaces, and is more particularly directed to an afterburner recycling system for eliminating pollutants from furnace emissions while at the same time providing a secondary heat source to a primary furance.

2. Brief Description of the Prior Art

In the known type of furnaces, and particularly in connection with furnaces which have an air medium therein, such as annealing furnaces, there are inherent inefficiencies in the process and also considerable pollution caused by the exhaust of the air medium into the atmosphere. Furnaces of this type are used to subject glass or metal, or the like, to a process of heating in order to toughen and reduce brittleness. This heating process usually results in the formation of noxious gases, particulate material, soot, and other pollutants. This contaminated process air in the past, before the introduction of laws and regulations governing pollution, was allowed to be vented directly into the atmosphere.

In addition to causing air pollution, furnaces of this type were inherently inefficient due to the loss of heat caused by exhausting the contaminated air to the atmosphere. Because the air needed to effect the process must be relatively contaminant free to support the annealing process, the contaminated air had to be directed to the atmosphere thereby requiring reheating of new air which is pumped into the furnace. This loss is not only an economical waste insofar as the substantial percentage of the potential heat is not utilized, but it also presents serious problems with respect to air pollution.

SUMMARY OF THE INVENTION

The principal object of this invention is to provide an exhaust treatment process for use in association with a furnace or the like which produces contaminated air as a by-product thereof which virtually eliminates air pollution and increases the efficiency of the furnace and the apparatus for effecting said process. More particularly, the invention is designed to burn all carbon monoxides, soot, burnable emissions, noxious gases and other pollutants thereby consuming said emissions that would ordinarily go to the atmosphere. The result is contaminant free air which complies with all air pollution standards now in effect.

It is a further object of this invention to provide a means of recyling the burned contaminant free air back into the furnace to take advantage of the heat added by said burning to increase the efficiency of the furnace.

An additional object of this invention is to furnish automatic controls which provide the proper thermal efficiency by removing only the right amount of heat of the burned contaminated air to use over in the process, controlling the amount of time that the contaminated air is subjected to a burner flame, and maintaining a safe furnace temperature operating range.

These and other objects of the invention are accomplished by one embodiment currently contemplated which generally includes a process for transporting the contaminated process air to a second furnace, providing a flame in the second furnace, burning the contaminated air for a sufficient period of time to produce substantially contaminant free air, and recycling the contaminant free air back to the first furnace. The second furnace is provided with primary and secondary air which is used to support the flame. The contaminated air comprises a tertiary air source to the second furnace. The process includes introducing the contaminated air into the second furnace along the length thereof annularly around the axis of the flame wherein the resultant air in the second furnace becomes contaminant free. The contaminant free air can be vented to the atmosphere.

The apparatus for effecting the above process generally includes a second furnace, a plurality of air supplies for the second furnace and means to recycle the air coming from the second furnace back to the first furnace. The second furnace has a housing, a combustion chamber, a burner having a fuel discharge nozzle disposed at one end of the chamber which is adapted to produce a flame by igniting a fluid fuel discharged under pressure through said nozzle, and conduit means disposed in the chamber at positions inwardly of the burner along the length of the chamber annularly around the axis of the flame.

There are three air supplying means. Two air supplying means provide air to the burner which comprise primary and secondary air sources to the second furnace. The other air supplying means comprises a tertiary air source which directs the contaminated air through the conduit means in the chamber around the periphery and along substantially the entire length of the burner flame. The air in the second furnace is burned for a given period of time to produce substantially contaminant free air.

Also included in the apparatus are means for drawing the burned contaminant free air through mixing means where outside air is injected into the contaminant free air to lower the temperature thereof and turbulently agitate the air leaving the second furnace with the outside air. Temperature sensitive control means are provided for controlling the temperature and rate of air being recycled back into the first furnace.

BRIEF DESCRIPTION OF THE DRAWINGS

FIG. 3 is an enlarged cross sectional view of a portion of the apparatus comprising the invention;

FIG. 4 is a sectional view taken generally along the line 4—4 of FIG. 3; and

FIG. 5 is a sectional view taken generally along the line 5—5 of FIG. 3.

DESCRIPTION OF THE PREFERRED EMBODIMENT

Figure 1:
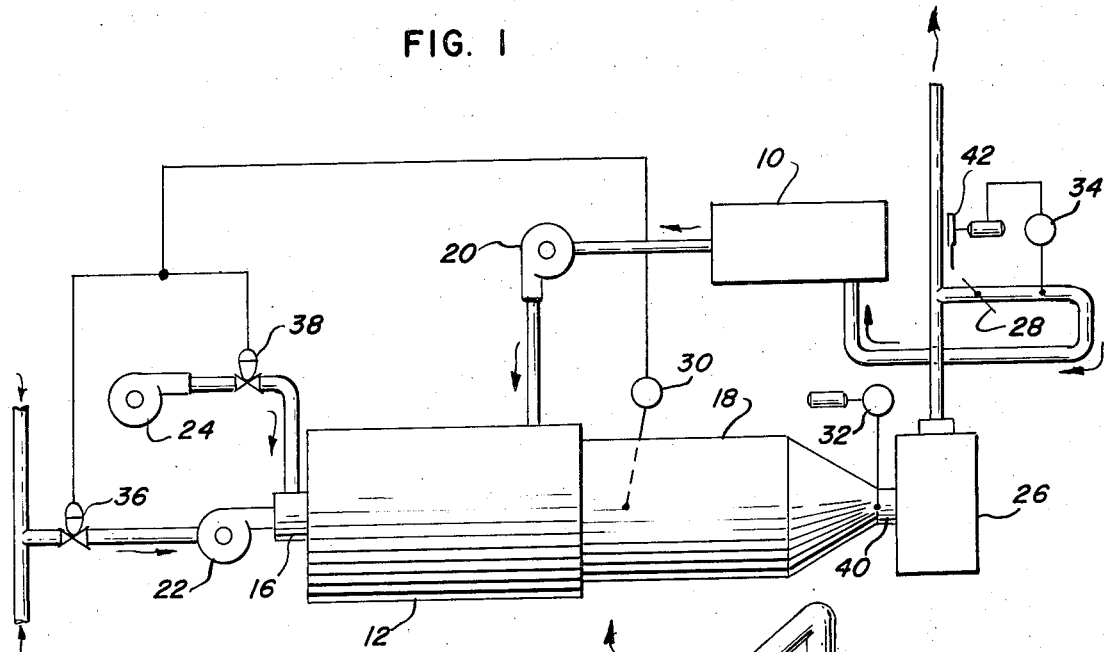
FIG. 1 is a schematic diagram of the process and apparatus of the invention.

Turning to FIG. 1 in greater detail, the apparatus of the invention is seen to generally comprise a first furnace 10, a second furnace 12 having a combustion chamber 14 with a burner 16 mounted at one end thereof and an injection mixer 18. The first furnace 10 in this embodiment is an annealing furnace which is used to subject steel to heat in order to increase toughness and reduce brittleness. The air that is used in the annealing furnace 10 must have oxygen and be raised to a relatively high temperature to support the process.

During the annealing process, fumes, odors, particulates, carbon monoxide, soot and other pollutants are being generated in the first furnace 10. In the past, the contaminated air was vented into the atmosphere and new air was then supplied to the annealing furnace and heated therein. This resulted in the problem of pollution and inefficiency.

To combat these problems, the present invention transports the contaminated air into the combustion chamber 14 of the second furnace 12 by means of a fan 20. Two sources of air are provided to the burner 16 by means of fans 22 and 24. The air supplied by fan 22 is mixed with fluid fuel in the burner. The secondary source of air is fed into the burner 16 by means of fan 24, and is used to supplement and support the combustion in the chamber 14 in a manner to be described in greater detail hereinafter. When the burner 16 is ignited, it produces a flame (not shown) which burns off all the contamination in the air which is present in the combustion chamber 14.

The burned contaminant free air is drawn out of the combustion chamber 14 and into the injection mixer 18 by means of an exhaust fan 26. The mixer 18 injects a selectively variable amount of outside air into the contaminant free air and turbulates this air.

Exhaust fan 26 can then direct the mixed contaminant free air back to the first furnace 10. Depending on whether a damper 28 is open or closed, all or a portion of the contaminant free air can be directed or vented to the atmosphere as pollution free exhaust.

For an annealing furnace, the first furnace 10 has an ambient temperature of about 500° to 800°F. The flame in the second furnace combustion chamber 14 is on the order of 1,000° to 2,200°F. By the time the air reaches the mixer 18 the temperature has been reduced by heat loss and the injection of outside air to about 800° to 1,600°F. The air from the mixer 18 is cooled slightly more as it goes through the exhaust fan 26 until it reaches a temperature of approximately 500° to 1,000°F.

Ideally speaking, the air which is to be recycled should have a temperature of the same order as the ambient temperature of the first furnace 10. If the temperature of the recycled air is too high the properties of the material which are present in the first furnace 10 may be undesirably altered. On the other hand, if the temperature of the recycled air going into the first furnace 10 is too cool, the annealing process will not take effect unless more heat is supplied to the first furnace. If more heat is required to be supplied to the first furnace, more energy must must be supplied thereby making the process more inefficient. Accordingly, it is desirable to provide temperature sensitive controls throughout the system to insure that the whole process is run as efficiently as possible. To this end, temperature controls 30, 32 and 34 and pressure sensitive valves 36 and 38 are provided.

Temperature control 30 measures the temperature of the air leaving the combustion chamber 14 of the second furnace. Temperature control 32 measures the temperature of the air leaving the mixer 18 in portion 40 of the system between the mixer 18 and the exhaust fan 26. Temperature control 34 measures the temperature of the air that is being recycled into the first furnace 10. Pressure sensitive valve 36 controls the amount of primary air and fuel which is fed into the burner 16. Pressure sensitive valve 38 controls the amount of secondary air which is fed into the burner 16.

Temperature control 30 is operably connected to pressure sensitive valves 36 and 38. As the temperature sensed by temperature control 30 drops below the desired range, pressure sensitive valves 36 and 38 allow a greater rate of air to be fed to the burner 16. This in turn causes a larger flame resulting in a higher temperature in the combustion chamber 15. In the same manner, if the temperature sensed by the temperature control is greater than the desired temperature, less air is fed to the burner 16 to lower the temperature in the combustion chamber 14.

Temperature control 32 is used to control the amount of outside air which is injected through the mixer 18 in a manner to be described in greater detail hereinafter. If the sensed temperature is too high, more outside air is injected into the contaminant free air.

Temperature control 34 is operably connected to damper 28 located in the pipe leading to the first furnace 10. If the temperature sensed by temperature control 34 is too high the damper 28 is closed by suitable means 42 so that the air will be vented to the atmosphere rather than go into the first furnace 10.

Figure 2:
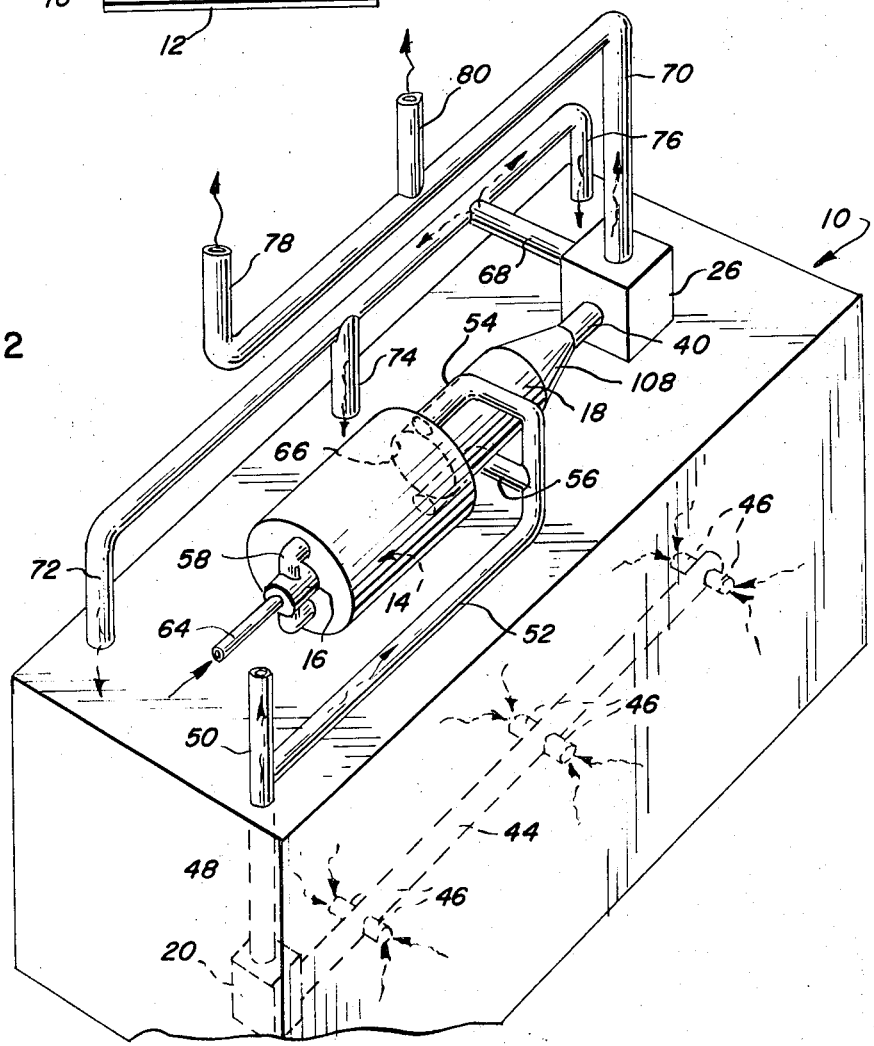
FIG. 2 is a front elevational view of the apparatus comprising the invention.

Turning now to FIG. 2 in greater detail, a suitable block arrangement of the system of this invention is shown. Inside the annealing furnace 10 is an interior horizontal pipe 44 having a plurality of air intake nozzles 46 in fluid communication therewith. The contaminated air of the furnace 10 is sucked through the nozzles 46 into the pipe 44 by means of the fan 20 upwardly through an interior vertical pipe 48. Pipe 48 has a vertical extension 50 rising above the furnace 10 which is capable of venting the contaminated air directly into the atmosphere. Pipe extension 50 is normally damped by suitable means (not shown) except for an emergency situation. In normal operation, the contaminated air is directed through an exterior horizontal contaminated or tertiary air supply pipe 52. Pipe 52 has two branches 54 and 56 which direct the contaminated air into the combustion chamber 14.

The secondary air source is outside air which is pumped through a portion of furnace 12 to be preheated and into a U-shaped secondary sir supply pipe 58 by fan 24 (not shown in FIG. 2). The secondary air is then directed to the burner 16 through U-shaped pipe 58. The primary air is pumped to the burner 16 by fan 22 (not shown in FIG. 2) through primary air supply pipe 64. The primary air can be preheated in the same manner as the secondary air.

The combustion chamber 14 and the mixer 18 are in fluid communication through opening 66 shown in phantom in FIG. 2. The burned contaminant free air is drawn from the combustion chamber 14 through the mixer 18 by fan 26 into one of two pipes 68 or 70. Pipe 68 directs the contaminant free air back to the first furnace 10 through branches 72, 74 and 76. The remainder of the air is vented to the atmosphere through pipe 70 through two branches 78 and 80 thereof.

Turning now to FIGS. 3 and 4 the second furnace 12 is shown in greater detail. The second furnace is very similar to the furnace described in my U.S. Pat. No. 3,174,530, patented Mar. 23, 1965 and entitled "Furnace Combustion Chamber," the contents of which are incorporated by reference herein.

The combustion chamber 14 comprises a generally cylindrical metal vessel or housing 82 and an interior surface 84 spaced therefrom for insulation defining the combustion chamber 14. The housing 82 has an end wall 86 wherein the burner 16 of the type suitable for use with fluid fuel such as gas or oil is mounted therein. The burner 16 has a nozzle 88 extending into the combustion chamber 14. The mixture of fuel and air particles is discharged from said burner 16 under pressure and is ignited to produce a flame (not shown) extending generally axially of the combustion chamber 14.

Two elongated conduits 90 and 92 of substantially the same diameter as pipe branches 54 and 56 are mounted in the combustion chamber extending lengthwise thereof. Each conduit 90 and 92 is in fluid communication with pipe branches 54 and 56 respectively through openings 94 and 96 respectively in the housing 82 at the end of the combustion chamber 14 opposite the burner 16 and is closed at the other end. Openings 94 and 96 have a greater diameter than either the pipe branches 54 and 56 or the conduits 90 and 92.

Each conduit 90 and 92 has a plurality of annular tubes 98 and 100 respectively which are disposed in fluid communication with each conduit and positioned in a generally coaxial, spaced-apart relation throughout the length of the combustion chamber 14. The annular tubes 98 and 100 are positioned along the length of the combustion chamber 14 so that the one tube is a tube 98 which is connected to conduit 90 and the next tube is a tube 100 connected to conduit 92 and so on in alternating repeating fashion.

The annular tubes 98 and 100 are provided with a series of jet nozzles 102 which extend inwardly through the interior surface 84 of the combustion chamber 14 forming openings 104 therein. The openings 104 are disposed essentially around the entire interior circumference of the surface 84 and the nozzles 102 are directed generally toward the axis of the flame (not shown) in the chamber 14.

In this embodiment, the nozzles 102 of the annular tubes 98 and 100 are directed so that air forced into the chamber 14 from the tubes will be generally perpendicular to the axis of the flame. In this way, air from the jet nozzles 102 will completely encircle the flame in the chamber 14.

As can be seen, the second furnace 12 has three air systems. The primary air system supplies outside air via fan 22 through pipe 64 to the burner 16. The primary air and fuel is then forced out of the center of the nozzle 88 and is ignited to produce a flame along the length of the chamber 14.

The secondary air system draws outside air by means of fan 24 through the space between openings 94 and 96 into the space surrounding the chamber between the housing 82 and interior 84 through U-shaped pipe 58 into the burner 16. As the outside air passes around the conduits 90 and 92 and tubes 98 and 100 it picks up heat before it reaches the burner 16. Once the secondary air reaches the burner 16 it is blown out of the nozzle 88 around the flame to support the flame along the length of the chamber 14. Because the secondary air is preheated, the heat loss which would ordinarily occur if air at room temperature were supplied is minimized.

The tertiary air system comprises the contaminated air from furnace 10 which is blown by fan 20 through pipe 52, branches 54 and 56 into conduits 90 and 92 respectively, through tubes 98 and 100 respectively and into the combustion chamber 14 to be burned along with the secondary air. This air becomes virtually contaminant free.

The primary and secondary air systems can originate from a common source, e.g., outside air, which can be preheated and directed in the same manner as already described with respect to the secondary air system. Thus, air can be drawn by one fan into openings 94 and 96 which is preheated while going through chamber 14 between the housing 82 and interior 84, through pipe 58 and into burner 16. The preheated air is divided in the burner 16 by suitable means into primary and secondary air which is used in the same manner described above.

The injection mixer 18 as shown in greater detail in FIGS. 3 and 5 is seen to generally comprise a cylindrical shell 106 open at both ends and mounted in fluid communication with the interior of the combustion chamber 14 and connected to a reduced portion 108 at the other end. The cylinder 106 has a plurality of longitudinal slots 110 formed therein through which outside air may enter. Mounted within each slot 110 is a vane 112. Each vane 112 can be adjusted to allow different amounts of air to be injected with the burned contaminant free air.

The air which was burned in furnace 12 and is contaminant free is drawn through the interior of the cylinder 106 by means of fan 26. While the contaminant free air is drawn through the mixer 18, outside air is provided to the interior thereof through slots 110 and turbulently mixed with the contaminant free air. The amount of outside air injected and mixed with the contaminant free air is dependent upon the speed of fan 26 and the angle at which each vane 112 is set.

The injection mixer 18 serves a threefold purpose. It first replenishes the contaminant free air with oxygen from the outside air which is needed for use in the process in furnace 10. Secondly, the mixer 18 mixes the air therein to form a uniform medium. Finally, the mixer 18, by injecting cooler outside air, lowers the temperature of the contaminant free air which is to be recycled to furnace 10.

Depending on the temperature sensed in the mixer 18 by temperature control 30, the rate in which the primary and secondary air sources are supplied to the furnace 12 is controlled which determines the temperature of the contaminant free air entering the mixer 18. Depending on the temperature of the air leaving mixer 18 as sensed by temperature control 32, the rate of outside air being injected by the mixer is regulated.

The speed of fan 26 not only determines the rate at which outside air is injected into the air passing through cylinder 106, but also determines the residence time of the contaminated air in the combustion chamber 14. If the contaminated air is not in the chamber 14 long enough, all the contamination will not be burned off. If the contaminated air is in the chamber 14 too long, the temperature of the air will be too high. It has been found that for a combustion chamber temperature of about 1,800°–2,200°F., the best residence time is approximately 0.6 to 0.8 seconds.

A portion of the air drawn from mixer 18 by fan 26 is vented into the atmosphere through pipe 70. The air that is vented is contaminant free and accordingly meets all existing pollution standards.

The remainder of the contaminant free air is recycled back into the first furnace 10. The amount of air that is recycled depends on whether damper 28 is open or closed which is dependent on the temperature of the air being recycled as sensed by temperature control 34.

Because the recycled air is of a relatively high temperature, it is not necessary to expend as much energy in connection with the annealing process taking place in the furnace 10 in order to raise the temperature thereof. Outside air can be used to supplement the medium inside the annealing furnace 10. As can be seen, the described system provides an efficient method of eliminating pollution while at the same time conserving energy.

This system can be used along with other processes besides an annealing process. Any process which needs heated air and produces contaminated air as a by-product thereof would be suitable to use in association with the described system.

I claim:

1. In a process including a furnace which produces contaminated air as a by-product thereof, an exhaust treatment process comprising the steps of:

transporting the contaminated process air to a second furnace;

providing separate streams of primary and secondary air to said second furnace, said contaminated air comprising a tertiary air source to the second furnace;

providing a flame in said second furnace;

introducing the tertiary contaminated air into the second furnace along the length thereof annularly around the axis of the flame;

burning said primary air, secondary air and tertiary air for a sufficient period of time to produce substantially contaminant free air; and recycling the contaminant free air back to the first furnace.

2. The process of claim 1 including the step of injecting and mixing outside air with the burned contaminant free air.

3. The process of claim 1 including the step of venting at least a portion of said contaminant free air to the atmosphere.

4. The process of claim 1 wherein the temperature in the second furnace is higher than the temperature in the first furnace.

5. The process of claim 1 including the step of preheating said secondary source of air.

6. In a system employing a furnace which produces contaminated air as a by-product thereof, exhaust treatment apparatus comprising:

a second furnace for burning said contaminated air, said second furnace including a housing defining a combustion chamber, a burner having a fuel discharge nozzle disposed at one end of the chamber which is adapted to produce a flame by igniting a fluid fuel discharged under pressure through said nozzle, and conduit means disposed in said chamber at positions inwardly of the burner along the length of the chamber annularly around the axis of the flame;

burner air supplying means for providing a source of air to be mixed with said fluid fuel in said burner;

chamber air supplying means for providing a selected rate of air through said conduit means to furnish air in the chamber around the periphery and along substantially the entire length of the burner flame, said chamber air supplying means providing air which indicates said contaminated air from said first furnace, whereby the air burned in the second furnace results in substantially contaminant free air;

third temperature control means for sensing the temperature of the contaminant free air and pressure sensitive means for controlling the rate of primary and secondary air furnished to the second furnace in response thereto; and recycling means for directing said burned contaminant free air to said first furnace.

7. In a system including a furnace which produces contaminated air as a by-product thereof, exhaust treatment apparatus comprising:

a second furnace for burning said contaminated air, said second furnace including a housing defining a combustion chamber, a burner having a fuel discharge nozzle disposed at one end of the chamber which is adapted to produce a flame by igniting a fluid fuel discharged under pressure through said nozzle, and conduit means disposed in said chambers at positions inwardly of the burner along the length of the chamber annularly around the axis of the flame;

burner air supplying means including means to supply a primary source of air to be mixed with said fluid fuel and means to supply a secondary source of air to the flame to support said flame along the length of the chamber;

chamber air supplying means for providing air through said conduit means in the chamber around the periphery and along substantially the entire length of the burner flame, said contaminated air comprising a tertiary air source, said secondary and tertiary air being burned in the chamber at a temperature greater than the temperature of the first furnace resulting in substantially contaminant free air;

mixing means for injecting outside air with the burned contaminant free air and turbulently agitating the resultant air;

exhaust means for drawing the contaminant free air out of the chamber and through the mixing means and supplying said contaminant free air to said first furnace;

recycling means actuatable for directing at least a portion of the mixed contaminant free air to the first furnace;

first temperature sensitive control means for controlling the recycling means whereby the rate of contaminant free air being allowed to enter the first furnace is controlled in response to the temperature of the contaminant free air;

second temperature sensitive control means for controlling the exhaust means whereby the rate at which outside air is allowed to be injected by the mixer and the length of time the contaminated air is allowed to be in the chamber is controlled in response to the temperature of the contaminant free air; and third temperature sensitive control means for controlling said burner air supply means whereby the rate of primary and secondary air being furnished to the burner is controlled in response to the temperature of the contaminant free air.

8. In a system employing a furnace which produces contaminated air as a by-product thereof, exhaust treatment apparatus comprising:

a second furnace for burning said contaminated air, said second furnace including a housing defining a combustion chamber, a burner having a fuel discharge nozzle disposed at one end of the chamber which is adapted to produce a flame by igniting a fluid fuel discharged under pressure through said nozzle, and conduit means disposed in said chamber at positions inwardly of the burner along the length of the chamber annularly around the axis of the flame;

burner air supplying means for providing a source of air to be mixed with said fluid fuel in said burner;

chamber air supplying means for providing a selected rate of air through said conduit means to furnish air in the chamber around the periphery and along substantially the entire length of the burner flame, said chamber air supplying means providing air which includes said contaminated air from said first furnace, whereby the air burned in the second furnace results in substantially contaminant free air;

mixing means for injecting outside air with the burned contaminant free air and turbulently agitating the resultant air, said mixing means including a hollow cylinder in fluid communication with said chamber and having a plurality of slots longitudinally formed therein, said slots allowing outside air to flow inwardly toward the center of said cylinder when the contaminant free air is drawn therethrough;

first temperature control means to control the amount of outside air to be injected in response to the temperature of the contaminant free air;

exhaust means for drawing the contaminant free air out of the chamber and through the mixing means to supply said contaminant free air to said first furnace; and recycling means for directing said burned contaminant free air and outside air to said first furnace.

9. The exhaust treatment apparatus of claim 8 including second temperature control means for controlling when said exhaust means is to be actuated in response to the temperature of the contaminant free air.

10. The exhaust treatment apparatus of claim 8 wherein the temperature of the combustion chamber of the second furnace is greater than the temperature of the combustion chamber of the first furnace.

11. The exhaust treatment apparatus of claim 8 wherein said secondary source supply means includes means to preheat said second source of air before it reaches the burner.

12. An exhaust treatment apparatus for eliminating contaminated air emanating from a first furnace including a second furnace connected to said first furnace for burning said contaminated air therein resulting in substantially contaminant free air, mixing means connected to said second furnace for injecting outside air with the burned contaminant free air and recycling means for directing at least a portion of said burned contaminant free air and outside air to said first furnace, the improvement in said mixing means comprising:

a hollow cylinder in fluid communication with said second furnace and having a plurality of slots longitudinally formed therein, said slots allowing outside air to flow inwardly toward the center of said cylinder when the contaminant free air is drawn therethrough.

13. The apparatus of claim 12 including temperature control means to control the amount of outside air to be injected in response to the temperature of the contaminant free air.

14. The apparatus of claim 13 including exhaust means for drawing the contaminant free air out of the second furnace and through the mixing means, said temperature control means controlling said exhaust means.

* * * * *

UNITED STATES PATENT OFFICE
CERTIFICATE OF CORRECTION

Patent No. __3,794,459__   Dated __February 26, 1974__

Inventor(s) __Cyril F. Meenan__

It is certified that error appears in the above-identified patent and that said Letters Patent are hereby corrected as shown below:

IN THE SPECIFICATION

Column 1, line 10, "furance" should be --furnace--.
Column 2, line 48, "FIG. 3" should begin a new paragraph.
Column 4, line 9, "15" should be --14--; and line 44, "sir" should be --air--.
Column 5, line 6, "The" should be --A--.

IN THE CLAIMS

Column 7, line 67, "indicates" should be --includes--.
Column 8, lines 20 and 21 "chambers" should be --chamber--.

Signed and sealed this 10th day of September 1974.

(SEAL)
Attest:

McCOY M. GIBSON, JR.　　　　　C. MARSHALL DANN
Attesting Officer　　　　　　Commissioner of Patents